Sept. 27, 1938.  A. S. EDMONDS  2,131,556
TRANSMISSION MECHANISM
Filed Feb. 27, 1937   2 Sheets-Sheet 1
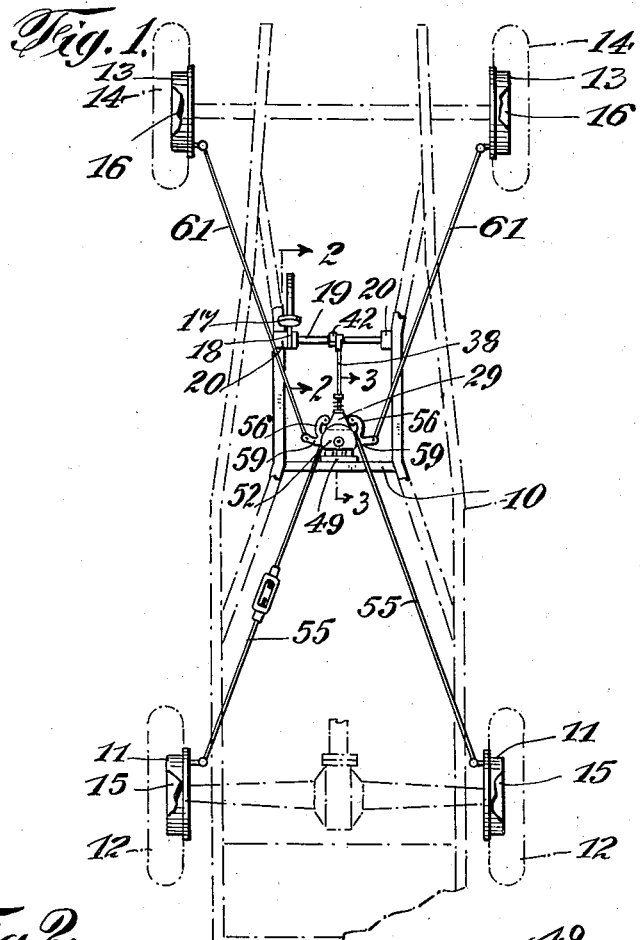
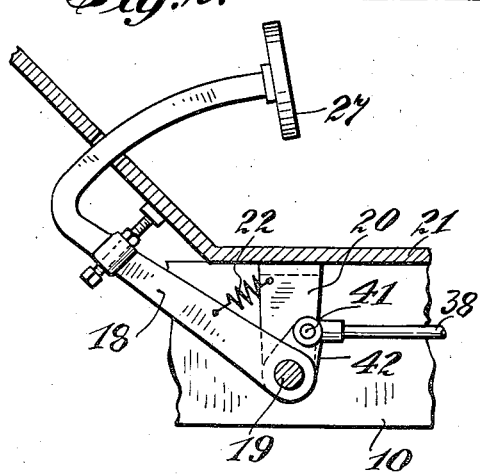
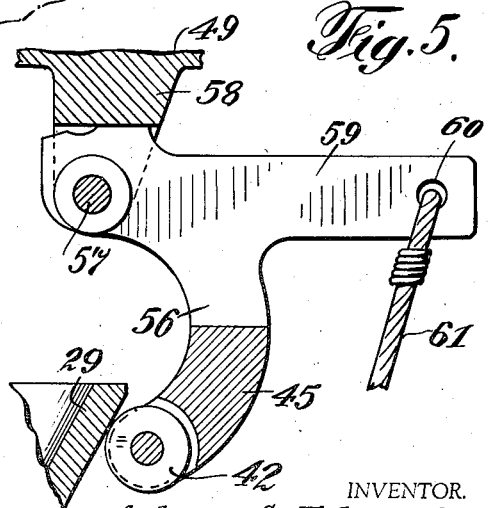
INVENTOR.
Asbury S. Edmonds
BY
his ATTORNEY.

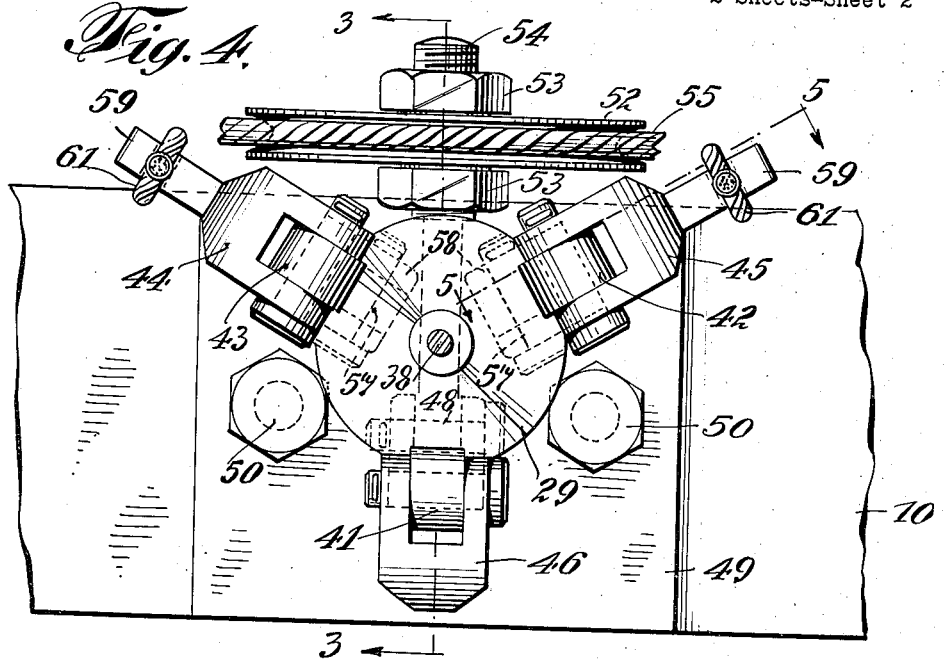
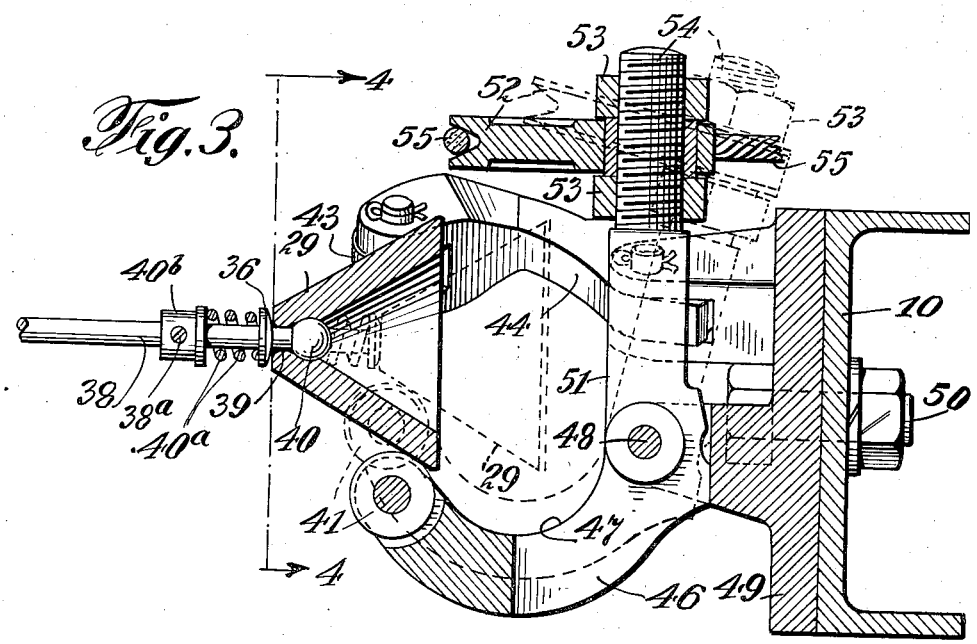

Patented Sept. 27, 1938

2,131,556

UNITED STATES PATENT OFFICE 2,131,556

TRANSMISSION MECHANISM

Asbury S. Edmonds, Ossining, N. Y.

Application February 27, 1937, Serial No. 128,253
In Great Britain March 20, 1936

6 Claims. (Cl. 188—204)

This invention relates generally to transmission, and more particularly to a transmission mechanism through the agency of which to transmit to a number of parts which are to be actuated, operating force derived from a single operating element.

The particular mechanism illustrated and described in this application has been devised in particular as a service brake transmission and equalizer for a four-wheel motor vehicle, and I desire to make it understood that in thus illustrating a particular example of my invention devised for the particular purpose indicated, I have not intended to limit the broader aspects of the invention to an arrangement adapted for that particular purpose. The mechanism of my invention involves principles of general application which may be variously adapted and modified for the transmission and equalization of forces. Therefore it is my intention to cover in some of the broader claims hereunto appended these principles in any modifications of construction and design in which they may be embodied, as well as to cover the particular adaptation of such principles herein illustrated for the particular purpose above indicated.

More specifically considered, the mechanism of the present invention includes a transmission assembly having a master element disposed to displace a set of associated members arranged for displacement in diverging directions for transmitting movement to transmission lines or branches severally connected with an actuable element which is to be operated from the operation of the master element. The purpose of the assembly and arrangement is to provide simple, practical and efficient means whereby to transmit operating force to a number of parts, for instance to the four brake shoes of a motor vehicle, from a single prime mover, for instance, the brake pedal of a motor vehicle.

A further object of the novel arrangement and assembly is to effect an equalization in the braking force in such manner that the amount of braking force exerted upon the two rear brake drums will be the same or substantially the same, and similarly that the amount of braking force made upon the front brake drums will be the same or substantially the same. In this connection, also, provision is made whereby greater braking force may be exerted upon the rear drums than upon the front drums; and if it should be desired, or if the character or type of the particular vehicle should make it necessary or desirable, such differences in applying braking force may be reversed, i. e., a greater braking force may be exerted upon the front brake drums than upon the rear brake drums, in any desired proportion.

The nature of the general principles and objects above referred to, as well as other and additional objects and advantages, and the manner in which they may be embodied in concrete form and means, are explained in the following detailed description of the particular mechanism herein illustrated as an example, and to which reference is now directed.

In the drawings, in which similar characters of reference indicate corresponding parts throughout the several views:

Fig. 1 is a top plan view, more or less diagrammatical in character, of a motor vehicle chassis embodying my invention;

Fig. 2 represents a fragmentary sectional side elevation on the line 2—2 of Fig. 1;

Fig. 3 is a sectional view, taken on line 3—3 of Figs. 1 and 4;

Fig. 4 is a front view of the mechanism of the invention, the top or cover of the housing having been removed, this view having been taken on the line 4—4 of Fig. 3, in the direction of the arrows; and Fig. 5 is a detail side view of one of the members actuated by the master element, taken on the line 5—5 of Fig. 4.

Referring now to the accompanying drawings, and first to Fig. 1, wherein for purposes of illustration I have shown an exemplification of my invention in connection with a motor vehicle in which the chassis 10, the rear brake drums 11 associated with the rear wheels 12, and the front brake drums 13 for the wheels 14, operate in the well-known manner. The illustrated drums are of the internal type and the usual cooperating brake shoes for the rear drums are indicated at 15 while those for the front drums are indicated at 16. A brake pedal is represented at 17 and this device, which in the present embodiment of my invention serves as the prime mover for my transmission mechanism, has its long lever portion 18 pivoted at 19 to a fixed support 20 below the floor board 21 and is normally maintained by pull spring 22 in position to be actuated by foot power in a well-known manner.

The transmission of my invention comprises a set of elements maintained within a suitable housing in coacting power transmitting relation which by themselves serve as parts of branch transmission lines, inasmuch as in addition to maintaining the elements in proper transmitting relation at all times, these devices also receive the power or force transmitted by the elements and in turn serve as means for passing the power or force received thereby, to the next succeeding parts in their respective branch power lines.

As shown in Figure 3, a master element 29, of conical shape, has its apex provided with an opening 39, through which a rod 38 passes, which rod is connected with the brake pedal lever 42 at 41. (See Figure 2.) The rod 39 has a ball-shaped end 40 and a washer 36, acted upon by the spring 40a acting against the adjustable sleeve 40b, secured to the rod 38 by the screw 38a.

The master element or cone-shaped member 29 is hollow, permitting a freedom of movement of the ball-shaped end 40 of the rod 38.

The exterior of the master element 29 is acted upon by three rollers 41, 42 and 43, supported at the ends of pivoted members 44, 45 and 46, respectively. The members 44 and 45 are of the same configuration, while the third member 46 is of a different configuration.

Each of these members upon its movement on its pivot, serves to actuate the braking mechanism. The member 46 actuates the rear brakes, and the members 44 and 45 actuate the front brakes.

The member 46 is clearly shown in Figure 3, and consists of a curved arm 47, the free end of which supports the roller 41. The curved arm 47 is pivoted at 48 to the frame 49, which in turn is fastened to the chassis 10 by bolts 50. At the other side of the pivot arm 48 an arm 51 extends, and upon this arm 51 a semi-circular pulley 52 is provided, between two adjustable nuts 53 on the screw threaded end 54. A cable 55 passes over this pulley, and the ends of the cable are secured to the rear brakes.

The two other pivoted members 44 and 45, are constructed in a manner as shown in Figure 5. The curved arm 56 has the roller 42, and is pivoted at 57 to a bracket 58 secured to the chassis, and an arm 59 extends outwardly, having its free end pivoted with a hole 60 for a cable 61 leading to one of the front brakes. These two members 44 and 45 are constructed alike.

It will be noted that the conical member 29 is concentric with the rollers 41, 42 and 43. When the rod 38 is moved in the direction of the left-hand side of the drawing, then the rollers are moved outwardly, and in consequence the two arms 59 are moved to the right on the drawing, which is to the rear of the chassis, whereas the arm 51 of the member 46 is moved in the opposite direction to that of the arms 59, and to the left of the drawing, which is the front on the chassis. Thereby the brakes are applied. The reverse movement of the conical member 29 to the position shown in dotted lines, brings the rollers inwardly, towards the apex portion of the cone, and releases the brakes, since the arm 51 moves towards the rear brakes, as also the arms 59 move towards the front brakes.

It will be noted that the conical member 29 is self-centering and operates substantially equable upon the ends of the fulcrum members even if this conical member is not exactly concentric with the circularly disposed ends of the fulcrum members.

In the embodiment shown, the fulcrums or pivotal points 57 and 48 are arranged substantially in a plane at right angles to the axis of the master element 29, and likewise the rollers 41, 42 and 43 are arranged substantially in a plane at right angles to the axis. The true axis is, of course, at right angles to the paper, in the Figure 4, at the point 38, but due to the floating characteristic of the cone member 29, the axis of the cone may shift to one side or the other of the true axis.

In practice, in order that the assembly may move easily and smoothly and revolve freely, the housing may be filled with suitable oil or grease lubricant, in which event the housing and its parts including openings for working parts should be so constructed or sealed as to prevent the loss of lubricant.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations, modifications and adaptations as come within the scope of the appended claims.

I claim:

1. In a transmission mechanism having front and rear pairs of brakes, the combination of a master transmission element, a lever mechanism connected therewith, three branch elements acted upon by said master element, said master element being floatingly associated with said branch elements, means connected with two of said branch elements adapted to operate one pair of the brakes, and means connected with the other of said branch elements adapted to operate the other pair of brakes.

2. In a transmission mechanism having front and rear pairs of brakes, the combination of a master transmission element of conical shape, a lever mechanism connected therewith, three branch elements acted upon by said master element, said master element being floatingly associated with said branch elements, means connected with two of said branch elements adapted to operate one pair of the brakes, and means connected with the other of said branch elements adapted to operate the other pair of brakes.

3. In a transmission mechanism having front and rear pairs of brakes, the combination of a floating, shiftable, cone-like member, three rollers co-acting upon the inclined side of the cone-like member, pivoted means supporting the rollers, means connecting certain of said pivoted means with one of said pairs of brakes, and means connecting the other of said pivoted means with the other pair of brakes.

4. In a transmission mechanism, three fulcrum members distributed in a common plane about a common axis, a cone-like floating and shiftable member acted upon by said fulcrum members at the intersection of said plane with said member, means connecting certain of said fulcrum members with one of said pairs of brakes, and means connecting the other of said fulcrum members with the other pair of brakes.

5. In a transmission mechanism, a floating and axially shiftable cone, and a pivoted member having one end contacting with the cone and movable thereby, and having its other end extend across the axis of the cone, whereby the cone contacting end causes, on the axial movement of the cone, the other end of the member to move in substantially same direction as the movement of the cone.

6. In a transmission mechanism, a floating and axially shiftable cone, a pivoted member having one end contacting with the cone and movable thereby, and having its other end extend across the axis of the cone, whereby the cone contacting end causes, on the axial movement of the cone, the other end of the member to move in substantially the same direction as the movement of the cone, and pivoted members each having one end contacting with the cone, and having the other end move in the direction substantially opposite to that of the axial movement of the cone.

ASBURY S. EDMONDS.